W. F. SCHMIDT.
YIELDABLE HOOK.
APPLICATION FILED MAY 28, 1914.
1,208,841. Patented Dec. 19, 1916.
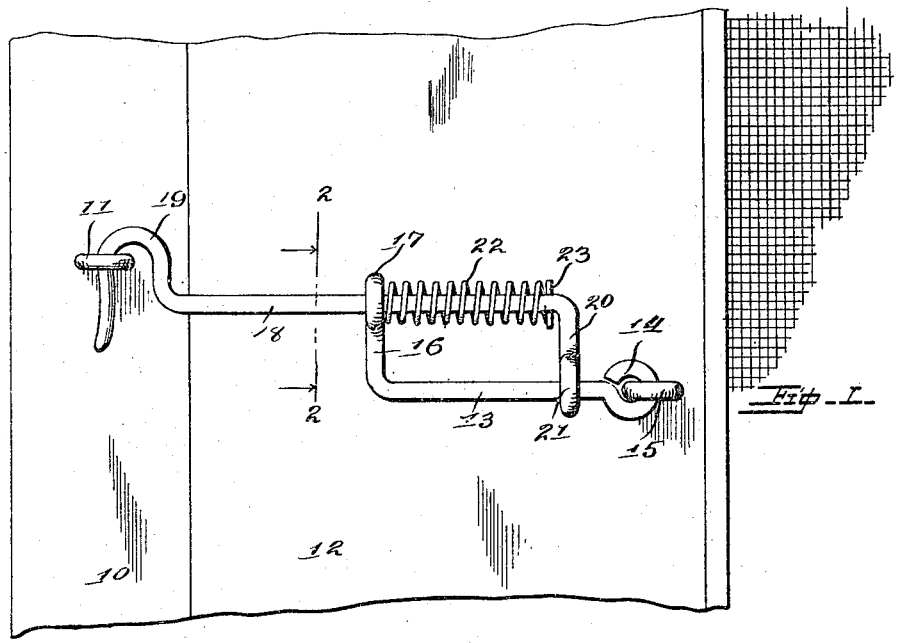
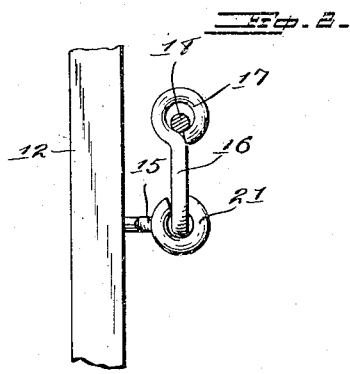
Inventor
William F. Schmidt.

UNITED STATES PATENT OFFICE.

WILLIAM F. SCHMIDT, OF GREEN BAY, WISCONSIN.

YIELDABLE HOOK.

1,208,841.  Specification of Letters Patent.  Patented Dec. 19, 1916.

Application filed May 28, 1914. Serial No. 841,622.

*To all whom it may concern:*

Be it known that I, WILLIAM F. SCHMIDT, a citizen of the United States, residing at Green Bay, in the county of Brown and State of Wisconsin, have invented certain new and useful Improvements in Yieldable Hooks, of which the following is a specification.

This invention relates to a hook which is intended to be used for holding screen doors and other hinged closures in a closed position and the principal object of the invention is to provide a hook which is so mounted that it will be yieldably held in a normal position thus permitting the hook to be easily fastened and unfastened but at the same time to cause the hook to be securely held in a fastened position.

Another object of the invention is to provide a hook of the character described which may be cheaply manufactured and which is principally formed from rod material such as heavy wire.

This invention is illustrated in the accompanying drawings, wherein—

Figure 1 is a view in elevation showing the hook in use; and Fig. 2 is a sectional view taken along the line 2—2 of Fig. 1.

In the accompanying drawings, the numeral 10 indicates the door jamb into which the screw-eye 11 is placed. The door 12 in the form shown is a screen door but it is obvious that this fastener could be used with any other type of door or with a hinged window or with any other closure with which the fastener could be conveniently used. The carrying element 13 is formed of heavy wire and has a shank with one end portion bent to form an eye 14 with which the carrying element is pivotally connected with the screw-eye 15 and has the opposite end portion bent to form an arm 16 terminating in a guiding eye 17. The securing element is also formed of heavy wire and is bent to form a shank 18 and a bill 19. The shank 18 passes through the guiding eye 19 and has its end portion bent to form an arm 20 which terminates in an eye 21 slidably mounted upon the carrying element 13. A spring 22 is placed upon the shank 18 of the hook between the guiding eye 17 and abutment pin 23 thus yieldably holding the hook in a normal position and securely holding the bill in engagement with the eye 11 when the fastener is in the position shown in Fig. 1.

It should be noted that the arms 16 and 20 are relatively long, thus providing a clearance space between the shank 13 and spring 22. In this clearance space an abutment can be placed, thus proving means for holding the fastener in a substantially horizontal position so that when the latch is disconnected from the eye 11 it will not swing downwardly but will remain in the position shown in Fig. 1. If it is desired to lengthen the hook the arm 16 may be bent toward the hook 19 and the arm 20 toward the eye 14. The hook will therefore be lengthened for a considerable amount, thus permitting it to be used in places where a hook of the standard size will be too short. Abutment or pin 23 permits spring 22 to expand in but one direction. When in use the screw-eye 15 is placed in the door 12 at such a point that it is necessary to compress the spring 22 in order to engage the eye 11 with the bill 19. When the hook is released the spring will expand and thus move the hook toward the screw-eye 15 and securely hold the hook in engagement with the eye 11 by frictional engagement. When it is desired to release the door the shank 18 is grasped and the hook moved upwardly to move the bill out of engagement with the eye 11. As this is done the spring will be compressed a sufficient amount to permit the bill to be easily released from the screw-eye carried by the door jamb. The hook is therefore slidably and pivotally connected with the door and is yieldably held in a normal position upon the carrying element 13, by means of the spring 22.

It is of course obvious that if desired some other resilient means could be provided in place of the spring or if desired some other type of spring could be used.

I have therefore provided a fastener which can be very cheaply manufactured and which will be very effective in securing a door.

What is claimed is:—

In a fastening device, a carrying element having a shank and a relatively long bendable arm disposed at an angle thereto and provided with an eye, a securing member having a shank slidable through said eye, a relatively long bendable arm extending at an angle from the second mentioned shank and provided with an eye, the first mentioned shank being slidable through the second mentioned eye, an abutment member on one of said shanks additional to said bendable arms, and an expansive spring abutting said member and one of said arms and surrounding one of said shanks so that it may expand in but one direction upon bending of the said bendable arms.

In testimony whereof I affix my signature in presence of two witnesses.

WILLIAM F. SCHMIDT.

Witnesses:
D. MAES,
FRED KRIEG.